(12) United States Patent
Riley et al.

(10) Patent No.: US 8,925,518 B1
(45) Date of Patent: Jan. 6, 2015

(54) USE OF PRECHAMBERS WITH DUAL FUEL SOURCE ENGINES

(71) Applicant: Woodward, Inc., Fort Collins, CO (US)

(72) Inventors: Michael B. Riley, Fort Collins, CO (US); Gregory James Hampson, Boulder, CO (US); Domenico Chiera, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 14/215,450

(22) Filed: Mar. 17, 2014

(51) Int. Cl.
*F02B 19/00* (2006.01)
*F02B 19/10* (2006.01)
*F02B 19/02* (2006.01)

(52) U.S. Cl.
CPC .............. *F02B 19/10* (2013.01); *F02B 19/00* (2013.01)
USPC .......................................... 123/261; 123/304

(58) Field of Classification Search
USPC ......... 123/261, 260, 267, 275, 293, 304, 575, 123/299, 300, 431, 27 GE
See application file for complete search history.

(56) References Cited

U.S. PATENT DOCUMENTS

| | | | |
|---|---|---|---|
| 2,552,561 A | 5/1951 | Jenny et al. | |
| 2,673,554 A * | 3/1954 | Thaheld | 123/26 |
| 2,758,576 A * | 8/1956 | Schlamann | 123/27 R |
| 2,937,634 A | 5/1960 | Lupfer et al. | |
| 2,960,834 A | 11/1960 | Patrick | |
| 2,975,604 A | 3/1961 | McMahon | |
| 3,034,309 A | 5/1962 | Muck | |
| 3,077,868 A | 2/1963 | Georges | |
| 3,270,722 A | 9/1966 | Bernard | |
| 3,471,274 A | 10/1969 | Medisch et al. | |
| 3,508,090 A | 4/1970 | Wilkinson et al. | |
| 3,608,529 A | 9/1971 | Smith et al. | |
| 3,775,976 A | 12/1973 | Karig | |
| 3,792,690 A | 2/1974 | Cooper | |
| 3,861,367 A | 1/1975 | Kelmar | |
| 4,004,413 A | 1/1977 | Ueno et al. | |
| 4,064,840 A | 12/1977 | Vierling | |
| 4,091,772 A * | 5/1978 | Heater et al. | 123/575 |
| 4,140,090 A | 2/1979 | Lindberg | |
| 4,224,045 A | 9/1980 | Olszewski et al. | |
| 4,441,469 A * | 4/1984 | Wilke | 123/295 |
| 4,560,397 A | 12/1985 | Cheung | |
| 4,696,270 A | 9/1987 | Pischinger | |
| 4,765,293 A * | 8/1988 | Gonzalez | 123/275 |
| 5,050,550 A * | 9/1991 | Gao | 123/275 |
| 5,081,977 A | 1/1992 | Swenson | |
| 5,117,800 A | 6/1992 | Watson et al. | |
| 5,375,580 A | 12/1994 | Stolz et al. | |

(Continued)

FOREIGN PATENT DOCUMENTS

| | | |
|---|---|---|
| DE | 102008045915 | 6/2010 |
| EP | 0397521 | 11/1990 |

(Continued)

*Primary Examiner* — Mahmoud Gimie
(74) *Attorney, Agent, or Firm* — Fish & Richardson P.C.

(57) ABSTRACT

A system has an engine. The engine has a combustion chamber, a pre-combustion chamber apart from the combustion chamber, and an opening spanning between the combustion chamber and the pre-combustion chamber. The engine also has a first fuel supply system adapted to supply liquid fuel to the pre-combustion chamber and a second fuel supply system adapted to supply a second, different fuel to the combustion chamber. In certain instances, an oxygen supply system supplies oxygen into the prechamber.

15 Claims, 5 Drawing Sheets

(56) References Cited

U.S. PATENT DOCUMENTS

| | | | |
|---|---|---|---|
| 5,390,646 A | 2/1995 | Swenson | |
| 5,400,746 A | 3/1995 | Susa et al. | |
| 5,517,978 A | 5/1996 | Yi | |
| 5,526,641 A | 6/1996 | Sekar et al. | |
| 5,553,591 A | 9/1996 | Yi | |
| 5,555,868 A * | 9/1996 | Neumann | 123/275 |
| 5,678,518 A * | 10/1997 | Grothe et al. | 123/298 |
| 5,706,675 A | 1/1998 | Manikowski, Jr. | |
| 5,718,194 A | 2/1998 | Binion | |
| 5,937,799 A | 8/1999 | Binion | |
| 6,173,567 B1 | 1/2001 | Poola et al. | |
| 6,352,068 B1 | 3/2002 | Jacobsen | |
| 6,397,825 B1 | 6/2002 | Klomp | |
| 7,377,272 B2 | 5/2008 | Davidson | |
| 7,827,974 B2 | 11/2010 | Beckmann | |
| 7,954,472 B1 | 6/2011 | Sturman | |
| 7,954,478 B1 | 6/2011 | Schechter | |
| 7,958,872 B1 | 6/2011 | Schechter | |
| 8,046,984 B1 | 11/2011 | Schechter | |
| 2002/0002827 A1 | 1/2002 | Viteri | |
| 2002/0104518 A1 | 8/2002 | Keefer et al. | |
| 2004/0144338 A1 | 7/2004 | Goldman | |
| 2004/0149503 A1 | 8/2004 | Faye et al. | |
| 2005/0126220 A1 | 6/2005 | Ward | |
| 2006/0042466 A1 | 3/2006 | Gaertner et al. | |
| 2006/0260358 A1 | 11/2006 | Kun | |
| 2007/0101975 A1 | 5/2007 | Moon | |
| 2007/0245982 A1 | 10/2007 | Sturman | |
| 2007/0266995 A1 | 11/2007 | Ha et al. | |
| 2008/0000436 A1 | 1/2008 | Goldman | |
| 2008/0223332 A1 | 9/2008 | Maro et al. | |
| 2008/0264393 A1 | 10/2008 | Sturman | |
| 2009/0173322 A1 | 7/2009 | Figl | |
| 2009/0193781 A1 | 8/2009 | Haase | |
| 2010/0300103 A1 | 12/2010 | Roby et al. | |
| 2010/0332106 A1 * | 12/2010 | Vanderslice et al. | 701/103 |
| 2011/0256052 A1 | 10/2011 | Merritt | |
| 2012/0103302 A1 * | 5/2012 | Attard | 123/260 |
| 2013/0037003 A1 | 2/2013 | Sheerin | |
| 2013/0247886 A1 | 9/2013 | Hamad et al. | |

FOREIGN PATENT DOCUMENTS

| | | |
|---|---|---|
| GB | 2073317 | 10/1981 |
| JP | 58158316 | 9/1983 |
| RU | 2049243 | 11/1995 |
| RU | 2290525 | 12/2006 |
| WO | WO2013007863 | 1/2013 |

* cited by examiner

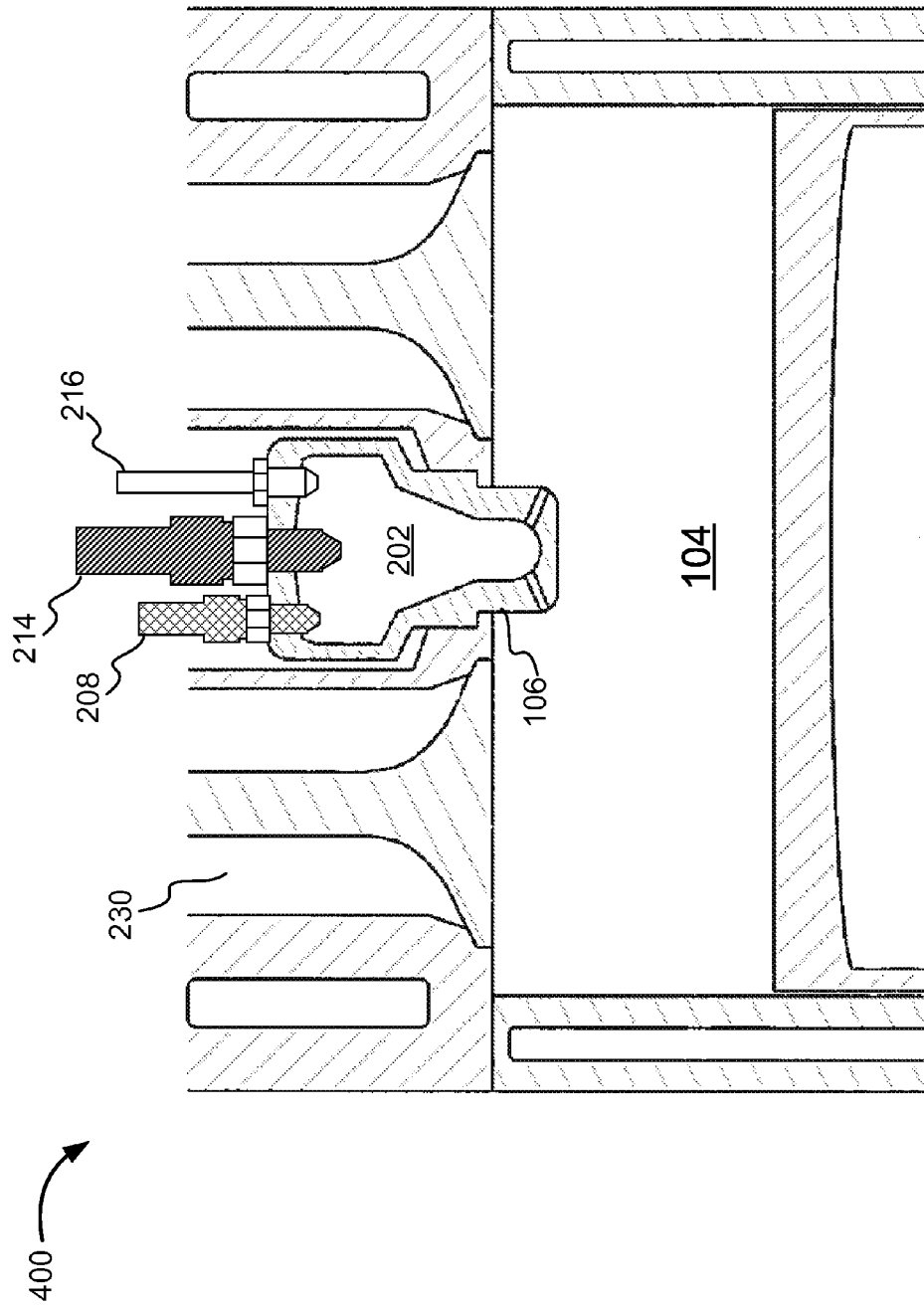

USE OF PRECHAMBERS WITH DUAL FUEL SOURCE ENGINES

BACKGROUND

There is a push to operate natural gas engines at leaner air/fuel ratios to achieve higher power density, improved thermal efficiency, and low oxides of nitrogen (NOx) emissions. As mixtures become leaner the burden on ignition systems rises. Prechamber spark plug technology is an effective way to provide reliable ignition even with homogeneous lean mixtures in the main cylinder. Reliable combustion in the prechamber plug generates the necessary pressure to drive turbulent jet combustion in the main combustion chamber. However, such systems have limitations beyond which the air/fuel ratio is too lean to yield reliable combustion in the prechamber and therefore in the main chamber as well. To overcome this limitation, a number of manufacturers have produced (and are using) fuel-fed prechambers (fuel FPCs, also known as scavenging or enriched prechambers), where a richer air/fuel ratio is created within the prechamber by the precise delivery of a small amount of fuel to the prechamber. Typically a fuel FPC has considerably more volume and thus can deliver much more energic jets than a prechamber spark plug. This richer mixture in the prechamber creates reliable ignition and combustion, which in turn generates the rapid pressure rise to drive turbulent jets into the main chamber.

However, fuel FPCs in internal combustion engines generally produce a significant portion of the total NOx output of an engine. This is due to the combination of time, temperature and the presence of nitrogen in the air used to combust the fuel in the prechamber. On the other hand, reliable ignition of the very lean mixtures in the main cylinder would be very difficult without these high energy jets expelled from the prechamber. The problem is achieving reliable combustion in the prechamber without significant NOx production.

A dual-fuel engine is an engine that is configured to run on two different types of fuel. For example, a dual-fuel engine can run on both natural gas and diesel. The dual-fuel engine can run on a single fuel as the primary fuel or a mixture of the two fuels. However, dual-fuel engines can have issues that limit efficiency. For example, engines that operate with spark ignition on natural gas do not operate at the same compression ratios as diesel engines primarily because of the issue of knock. These engines have lower compression ratios than diesel engines to prevent knock. Thus, a dual-fuel engine having a lower compression ratio for natural gas operation will have reduced efficiency during diesel operation.

DESCRIPTION OF DRAWINGS

FIG. 3A is a schematic detail diagram of an oxygen-supplied and liquid-fueled prechamber with a glow plug.

Like reference symbols in the various drawings indicate like elements.

DETAILED DESCRIPTION

Figure 1A:
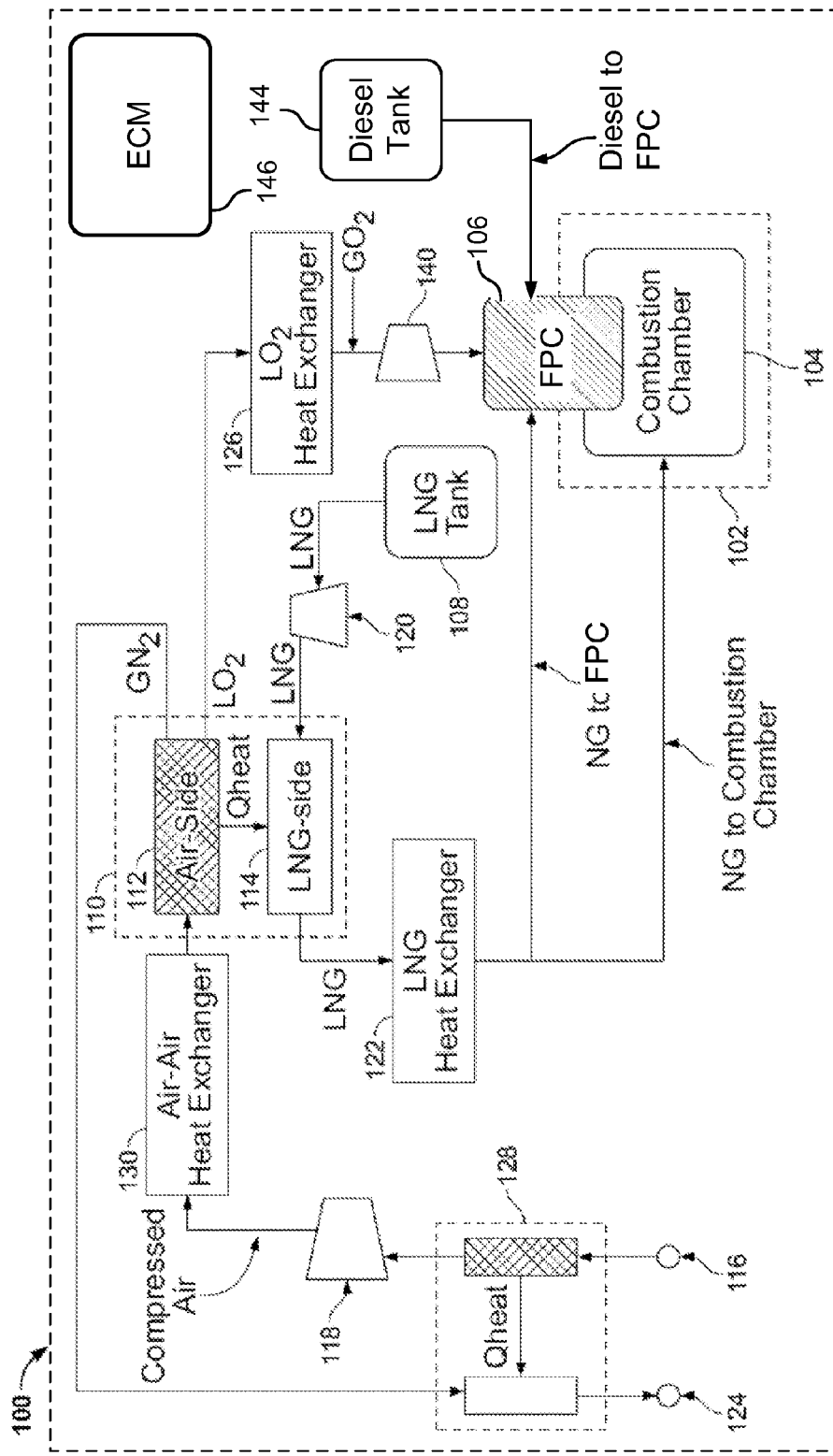
FIG. 1A is a schematic diagram of an example engine system.

FIG. 1A depicts an example engine 102 with an engine system 100. The example engine system 100 includes a system that supplies oxygen to the engine 102. The example engine 102 is a reciprocating piston engine that uses natural gas for fuel, but other engine configurations are within the concepts herein. The engine system 100 can be incorporated on a skid carrying or associated with the engine 102 or a vehicle powered or not by the engine 102. The engine 102 includes one or more combustion chambers 104 (one shown) each having a fed prechamber (FPC) 106, fed by one or more of liquid fuel, gaseous fuel and oxygen. In certain instances, the FPC 106 is in the form of a FPC igniter (e.g., spark plug, laser igniter, hot surface, hot gas and/or other type of igniter). However, other configurations are within the concepts herein.

The example FPC 106 is configured to receive and ignite a feed of one or more gaseous fuels (e.g., gaseous methane, natural gas, biogas, landfill gas, propane or other gaseous fuels or short chain hydrocarbons referred to as fuel gas) and/or liquid fuels (e.g. diesel, biodiesel, dimethyl ether, biodimethylether (bioDME), gasoline and/or other) and a feed of gaseous oxygen, and produce turbulent jets of flames into the combustion chamber 104. The jets, in turn, ignite natural gas or other fuels in the combustion chamber 104. The engine system 100 includes a fuel gas supply system, a liquid fuel supply system, and an oxygen supply system. The fuel gas supply system and liquid fuel supply system are fuel supply systems configured to supply fuel gas and liquid fuel, respectively, to the engine 102. For example, the fuels can be supplied to the FPC 106, to the combustion chamber 104, and/or to the intake of the engine 102. The fuel gas supply system, the liquid fuel supply system and the oxygen supply system each include a fuel source (i.e. the liquid natural gas tank 108 and the diesel fuel tank 144), fuel lines, mixers, and/or fuel injectors. The fuel gas supply system, the liquid fuel supply system, and the oxygen supply system and their operation are described in greater detail below. The combustible portion of natural gas is composed primarily of methane, but can be found naturally with as much as 60% non-combustibles, such as $CO_2$ or $N_2$. The natural gas can be augmented with short-chain hydrocarbons such as $C_2H_2$, $C_2H_6$, $C_3H_8$, etc., as well as other reactive species such as $H_2$ and CO, and still be referred to as natural gas. The terms "natural gas" and "methane" are essentially interchangeable within the concepts herein. In some embodiments, liquid fuel is also supplied to the FPC 106 from a tank 144 by the liquid fuel supply system. The liquid fuel can be combusted as a pilot fuel or as the primary fuel. The supply of fuel and oxygen to the prechamber act to purge the FPC 106 of nitrogen (all or substantially all).

The ECM 146 controls operation of the engine system 100, the fuel gas supply system, the liquid fuel supply system, and the oxygen supply system. The ECM 146 can adjust the engine system 100 to accelerate or decelerate, or to provide more or less power.

The oxygen supply system includes an oxygen source, such as an oxygen tank, a system like that described in FIG. 1A, and/or another source. The oxygen supply system also includes associated lines, injectors, and the oxygen control aspects of the ECM 146. In operation of the engine, the oxygen supply system supplies oxygen to the engine 102 under control of the ECM 146. For example, the oxygen supply system can be adapted to supply an oxygen flow to a pre-combustion chamber such as FPC 106 from FIG. 1A or prechamber volume 202 from FIG. 1B, 3A, or 3B.

The fuel gas supply system and liquid fuel supply system each include fuel sources (e.g., a fuel tank and/or another source), fuel lines, fuel/air mixers and/or fuel injectors, and the fuel control aspects of the ECM 146. In one example, the engine system 100 has a first fuel supply system that is a diesel fuel supply system to supply diesel fuel to the engine 102 and a second fuel supply system to supply gaseous natural gas to the engine 102. Many other examples exist, and other fuels can be supplied to the engine 102. The liquid fuel supply system can be adapted to supply the liquid fuel into the FPC 106 or the combustion chamber 104 as a primary fuel or as a pilot fuel. The fuel gas supply system can be adapted to supply fuel gas to the FPC 106 or the combustion chamber 104 of the engine as a primary fuel. For example, the fuel system can be adapted to supply the fuel gas to the combustion chamber via a fuel gas outlet to the intake of the engine or via an injector with an outlet to the combustion chamber of the engine or to a pre-combustion chamber of the engine. The fuel gas supply system and the liquid fuel supply system are adapted to supply the fuel under control of the ECM 146. The ECM 146 can control fuel injectors or air/fuel mixers associated with each fuel supply system. For example, the ECM 146 can control the proportion or amount of oxygen and each type of fuel that is supplied to the engine 102, or the ECM 146 can control each fuel's flow rate, pressure, amount, timing, lambda, etc.

Figure 1B:
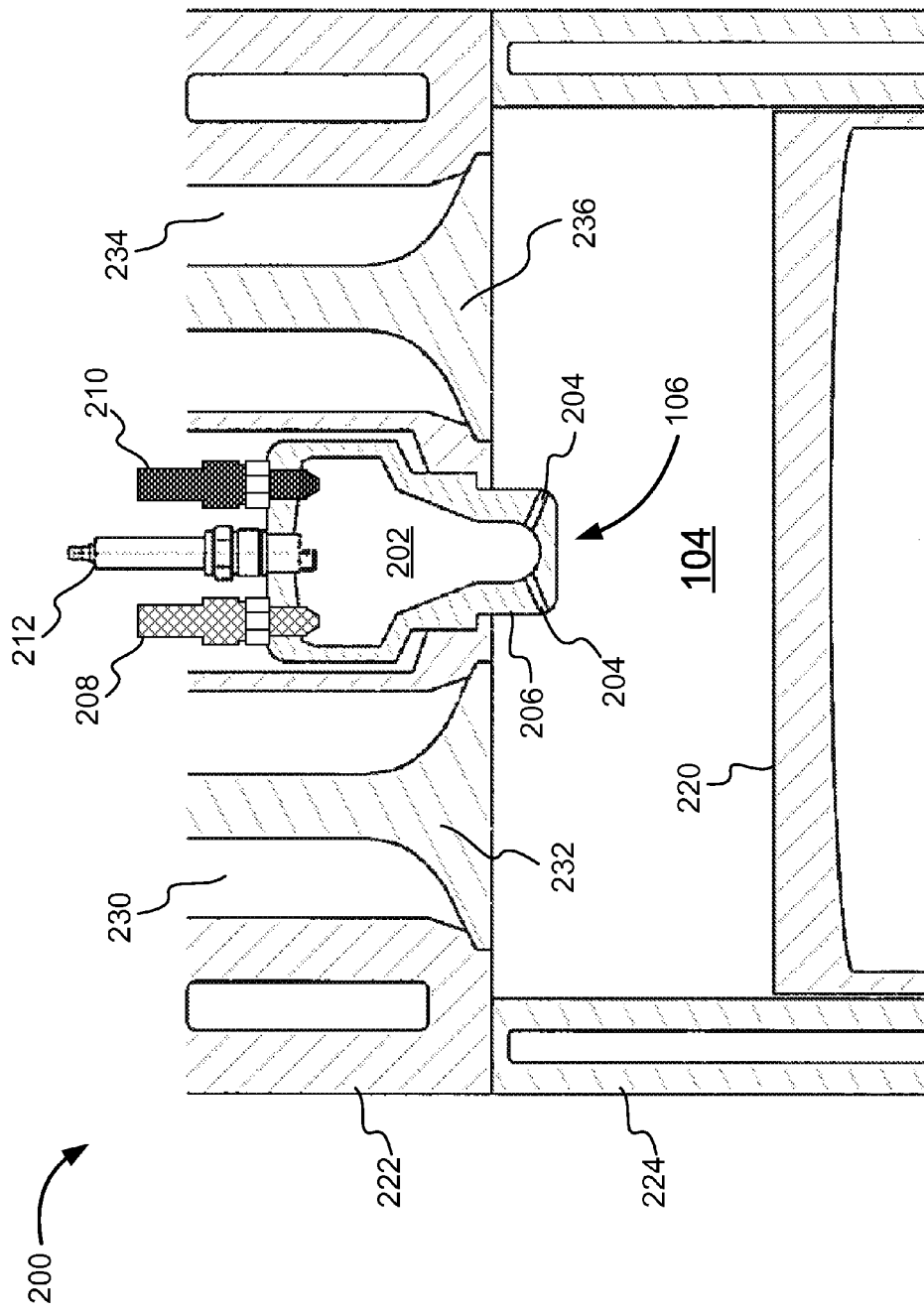
FIG. 1B is a schematic detail diagram of an oxygen and fuel-fed prechamber with a spark plug.

FIG. 1B shows a cross-section of a portion of an example engine 200. The example internal combustion engine 200 is a reciprocating engine and includes a head 222, a block 224, and a piston 220. The piston 220 is located inside a cylinder inside the block 224. The piston 220 is able to reciprocate inside the cylinder during engine operation. The combustion chamber 104 is a volume located inside the cylinder between the head 222 and the piston 220, and is bounded by the block 224.

The engine 200 includes an example FPC 106 that is located in the head 222 and is adjacent to the combustion chamber 104. The FPC 106 includes a prechamber volume 202 that is connected to the engine combustion chamber 104 by a series of ventilation holes 204 and bounded by a shell 206. The ventilation holes 204 span between the prechamber volume 202 and the combustion chamber 104 and allow unburned fuel, oxygen, flames, and partially or completely combusted reactive radicals (e.g., $OH^-$, CO) to exit the prechamber volume 202 into the combustion chamber 104. The example FPC 106 includes an oxygen injector 208 and a fuel injector 210. The oxygen injector 208 feeds a flow of oxygen (the flow being entirely or substantially oxygen) directly into the prechamber volume 202 of the FPC 106. The oxygen can be supplied to the oxygen injector 208 from the oxygen generation system described below with reference to FIG. 1A. The fuel injector 210 feeds fuel directly into the prechamber volume 202, that together with the flow of oxygen, purges prechamber volume 202 of nitrogen. The oxygen and fuel mix and are ignited in the prechamber volume 202.

This example FPC 106 includes an example igniter 212. The igniter 212 ignites the oxygen/fuel mixture in the prechamber volume 202. After ignition, the combusting oxygen/fuel mixture expands, greatly increasing the pressure inside the prechamber volume 202, and jets out of the ventilation holes 204 into the combustion chamber 104 where it ignites the fuel in the engine combustion chamber 104. The ventilation holes 204 can be jet apertures or other nozzles that concentrate the combusting mixture exiting the prechamber volume 202 into one or more flaming jets that extend into the combustion chamber 104. The jets can, in certain instances, reach most of the way to the sidewalls of the combustion chamber 104 to facilitate igniting all of the fuel/air mixture in the combustion chamber 104.

The FPC 106 of FIG. 1B is but one example; many other examples are described below. Also, other configurations of FPCs and FPC igniters, including other manners of ignition (spark plug, heated surface, laser and/or others) could be used. Likewise, the FPC 106 need not be integrated with the igniter, but could be a chamber formed in the engine's head or elsewhere that operates in concert with the igniter 212, or in instances where the fuel in the combustion chamber 104 is compression ignited (e.g., diesel), not in concert with an igniter. In some implementations, only oxygen is supplied to the FPC 106. In some implementations, fuel is not injected into the prechamber volume 202 but may enter FPC 106 from combustion chamber 104. In some implementations, fuel can be supplied into the main chamber 104 in either a homogeneous or stratified manner that results in a rich mixture near the prechamber volume 202 during the compression stroke when the cylinder volume is decreasing as the piston moves toward the cylinder head and generates compression pressure within the main chamber and thus a flow of mixture into the prechamber.

The example internal combustion engine 200 includes an intake passage 230 with intake valve 232 and an exhaust passage 234 with exhaust valve 236. The passages 230, 234 are in the head 222 adjacent to the combustion chamber 104, and the valves 232, 236 form part of the walls of the combustion chamber 104. During engine operation, the intake valve 232 opens to let a fresh charge of air/fuel mixture flow from the intake passage 230 into the combustion chamber 104. In other instances, the intake valve 232 admits only air and a fuel injector located in the combustion chamber 104 and/or in the prechamber volume 202 admits fuel to form the air/fuel mixture in the combustion chamber 104. After combustion, the exhaust valve 236 opens to exhaust combustion residuals out of the combustion chamber 104 and into the exhaust passage 234. Although the concepts herein are described with respect to a reciprocating internal combustion engine, the concepts could be applied to other internal combustion engine configurations.

In the example of FIG. 1A, the fuel gas provided to the engine 102 is stored as liquefied natural gas (LNG) in LNG tank 108. The oxygen provided to the FPC 106 is produced in a heat exchanger 110. The heat exchanger 110 includes an air-side 112 that is provided with air from an air inlet 116, and an LNG-side 114 that is provided with LNG from LNG tank 108. The heat exchanger 110 transfers heat from air-side 112 to the LNG-side 114, and thus transfers heat from the air to the LNG, cooling the air. In certain instances, the air from air inlet 116 is compressed by compressor 118 prior to transfer to air-side 112. For example, the compressor 118 can compress the air to a pressure in the range of 6-15 bar. In certain instances, the LNG from LNG tank 108 is compressed by compressor 120 prior to transfer to LNG-side 114. For example, the compressor 120 can compress the LNG to a pressure in the range of 6-20 bar.

The heat exchanger 110 design and inlet conditions of the oxygen and LNG are selected so that the heat exchanger 110 cools the compressed air in the air-side 112 to a temperature that the nitrogen component of the air remains gaseous, but the oxygen component of the air condenses into a liquid. The gaseous nitrogen component is separated from the liquid oxygen component by venting the nitrogen and/or other gas-liquid separation techniques and exhausted through $N_2$ exhaust 124. The liquid oxygen component is then transferred to the FPC 106 to be used in ignition and combustion. In certain instances, the liquid oxygen is first heated to vaporization in a $LO_2$ heat exchanger 126 prior to transfer into the FPC 106. The $LO_2$ heat exchanger 126 transfers heat to the liquid oxygen from a heat source such as an engine coolant. In some cases, a compressor 140 compresses gaseous oxygen from heat exchanger 126 for delivery to FPC 106. For example, the compressor 140 can compress the gaseous oxygen to a pressure up to 200 bar.

The output of the LNG-side 114 of the heat exchanger 110 is coupled to a LNG heat exchanger 122. The LNG heat exchanger 122 transfers heat to the LNG from a heat source such as engine coolant. If the heat absorbed at the heat exchanger 110 does not vaporize the LNG, the heat transfer in heat exchanger 122 can vaporize or ensure vaporization of the LNG into gas. The gaseous fuel gas is then supplied to both the combustion chamber 104 and the FPC 106 as fuel.

The gaseous nitrogen vented from the heat exchanger 110 is cooler than atmospheric air. In some cases, the $N_2$ exhaust 124 is coupled to another heat exchanger 128 configured to pre-cool and dehumidify air entering the compressor 118 by using the $N_2$ exhaust as a heat sink. In some cases, the compressed air is pre-cooled using an air-to-air heat exchanger 130. Thus, the air entering the heat exchanger 110 can be pre-cooled some amount and reduce the burden of the heat exchanger 110. The heat exchanger 110 can further dehumidify the air.

Figure 2:
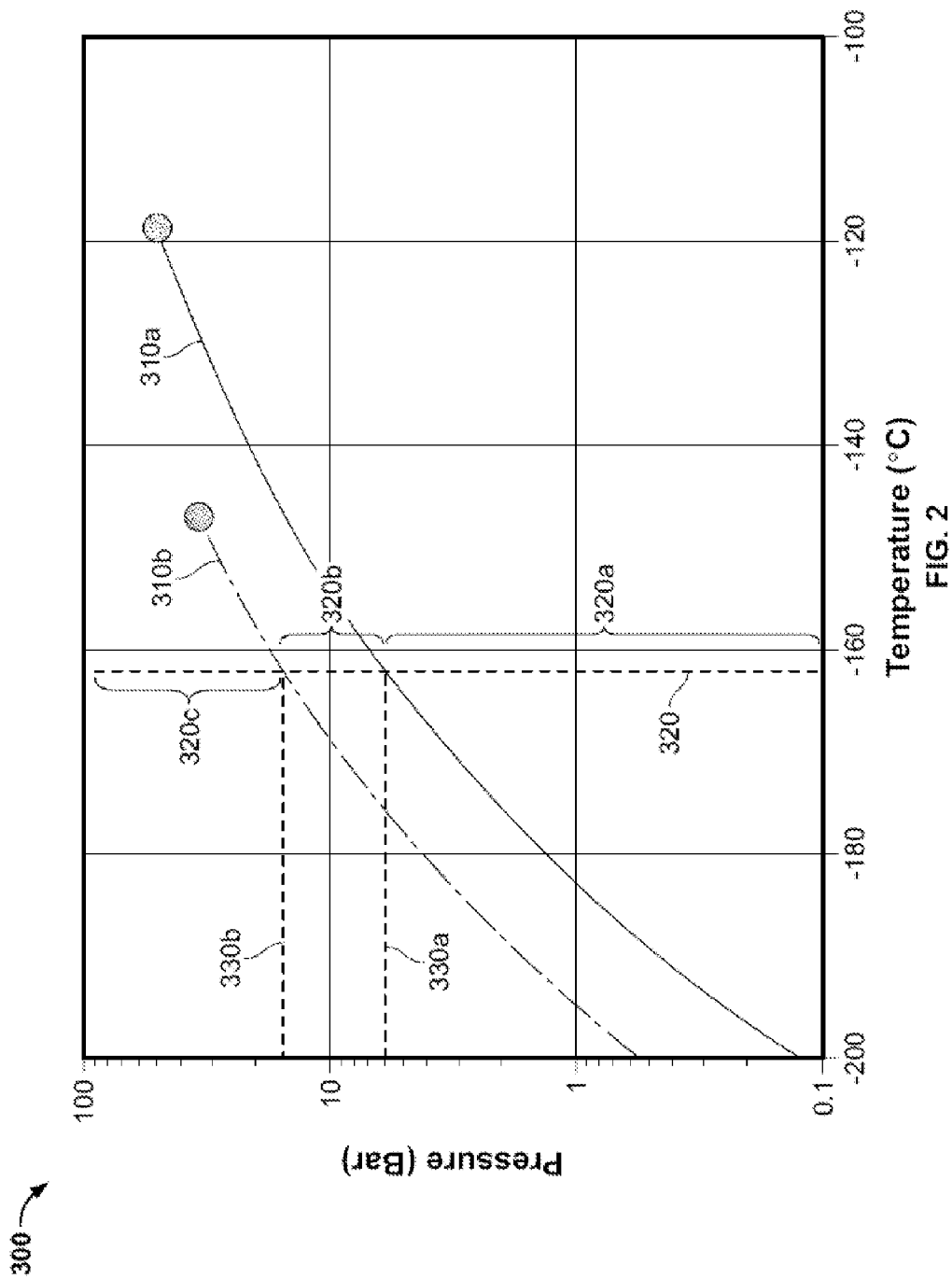
FIG. 2 is a plot of vapor pressures of oxygen and nitrogen at low temperatures.

The cryogenic separation process for the air described above, is implemented using LNG as a heat sink, for example in an air/LNG heat exchanger such as heat exchanger 110 in FIG. 1A. FIG. 2 shows plot 300 of the vapor pressures of oxygen and nitrogen. The x-axis of plot 300 is the temperature in degrees Celsius. The y-axis of plot 300 is the vapor pressure in bar. Curve 310a represents the vapor pressure of oxygen and curve 310b represents the vapor pressure of nitrogen. In general, at a given temperature, a substance at a pressure below its vapor pressure will be in a gaseous form, and a substance at a pressure above its vapor pressure will be in a liquid form. Line 320 marks a temperature of approximately −162° C. on plot 300. The temperature −162° C. is the approximate temperature of the LNG entering the air/LNG heat exchanger in an oxygen supply prechamber system, and is used here as an example temperature. While LNG at approximately −162° C. is used in the example system described herein, this approach can be used for any fuel that has a storage temperature low enough for cryogenic separation of air. For example, a fuel stored at −120° C. or below can be used, although the required air pressure will be higher than that at −162° C.

Lines 330a and 330b mark the values of the equilibrium vapor pressure at a temperature of −162° C. for oxygen and nitrogen, respectively. Line 330a indicates that the vapor pressure of oxygen at −162° C. is approximately 6 bar. Line 330b indicates that the vapor pressure of nitrogen at −162° C. is approximately 15 bar.

At a temperature of −162° C. (line 320), oxygen will be liquid at pressures above approximately 6 bar, as shown by line segments 320b, 320c. Oxygen will be gaseous as pressures below 6 bar, as shown by line segment 320a. Similarly, nitrogen will be gaseous at pressures below approximately 15 bar as shown by line segments 320a and 320b, and liquid at pressures above approximately 15 bar as shown by line segment 320c. Thus, for a gaseous mixture of nitrogen and oxygen (i.e. air) cooled to −162° C., the oxygen component may be condensed to a liquid while leaving the nitrogen component in a gaseous state if the pressure is kept between approximately 6 and 15 bar. This is represented by line segment 320b.

In the example engine system 100 shown in FIG. 1A, the air is cooled in a heat exchange with LNG. The air has been compressed to an appropriate pressure (e.g. 6-15 bar) prior to the heat exchanger. Thus, as shown in FIG. 2, the oxygen component of the air can be condensed to liquid and the nitrogen component of the air can remain gaseous.

In certain instances, the engine system 100 described herein can reduce the amount of NOx produced during combustion over a conventional prechamber system. The oxygen-supplied system reduces production of NOx, because the amount of nitrogen in the prechamber is less. Supplying oxygen purges all or a portion of the air from the prechamber and thus reduces the amount of air in the prechamber/combustion chamber volume. Less nitrogen in the prechamber translates to less nitrogen available for NOx formation. In certain instances, NOx production can be reduced so as to eliminate the need to provide aftertreatment to the engine's exhaust.

Also, the mass of oxygen needed to be supplied to achieve a specified oxidizer/fuel ratio (if oxygen alone is supplied to the prechamber) can be less than the mass of air needed for an equivalent ratio of oxidizer/fuel if air is used, because the diluents in air (primarily nitrogen) are omitted. Thus, a prechamber supplied with oxygen can have a smaller volume to produce a given fuel charge than a prechamber using air. Notably, since the mass and the volume of oxygen are less, the power required to compress oxygen prior to injection into an oxygen-supplied prechamber can be less than the power required to compress air prior to injection into an air-charged prechamber. For example, the mass flow of oxygen to an oxygen-charged prechamber may be as much as 90% lower than air to an air-charged prechamber.

An air-supplied prechamber needs to have a lean air/fuel ratio to reduce NOx formation. With less nitrogen available, an oxygen-supplied prechamber can run closer to a stoichiometric oxygen-to-hydrocarbon ratio than an air-supplied prechamber, improving ignition reliability and combustion stability. The air/fuel ratio for a particular fuel can be described by a parameter lambda, in which lambda is defined as the actual air/fuel ratio divided by the stoichiometric ratio. For example, a lean air/fuel mixture must have a lambda greater than one.

In certain instances, it may be beneficial to charge the prechamber volume 202 with either more oxygen or more fuel than required. More oxygen would produce turbulent jets into the combustion chamber that would cause combustion to commence within the jets, shortening the combustion duration if required. More methane would produce rich jets that would burn with a diffusion flame similar to a diesel engine, but preferably with a shorter duration as the fuel is already a vapor.

Because the engine system 100 described herein generates a supply of oxygen, it does not require a separate source of oxygen, such as a storage tank of liquid oxygen that must be periodically refilled. By not requiring a separate source of oxygen, the system can be more readily incorporated, whereas space constraints (e.g., vehicles) or accessibility (e.g., remote locations) make having a separate storage tank impracticable. Other manners of supplying oxygen may include a storage tank or a cryogenic system that cools ambient air sufficiently without the cold reservoir available with an LNG tank.

FIG. 3A depicts an example engine 400 with indirect diesel injection (IDI). The engine 400 is substantially similar to the engine 200 shown in FIG. 1B, including a combustion chamber 104, a FPC 106, and a prechamber volume 202. The example engine 400 also includes an oxygen injector 208 and a liquid fuel injector 214 with outlets to the prechamber volume 202. The liquid fuel injector 214 located within the prechamber volume 202 can act as an indirect diesel injection system, and the liquid fuel can be injected earlier and under lower pressure than in direct injection systems. The example engine 400 also includes a glow plug 216 in the prechamber volume 202, though the glow plug 216 may not be present in other embodiments. The liquid fuel injector 214 can be coupled to a fuel supply system such as the diesel fuel supply system in FIG. 1A. The example engine 400 also includes an oxygen supply system (not shown) that can supply a flow of oxygen (entirely or substantially oxygen) to the prechamber volume 202 of the engine. The oxygen injector 208 can be coupled to an oxygen supply system such as described in FIG. 1A. The oxygen injector 208 and the oxygen supply system may not be present in other embodiments.

The example engine 400 also includes a fuel gas supply system (not shown) that can supply fuel gas to the intake passage 230 of the engine. For example, the fuel gas can be supplied via a fuel/air mixer or a fuel injector in the intake. The fuel gas supply system can be a system such as described in FIG. 1A. In other embodiments, the fuel gas supply system supplies the fuel gas directly to the combustion chamber 104, such as through a separate fuel gas injector. In some examples, the fuel gas supply system can supply the fuel gas to the combustion chamber at a global (or overall) lambda of 1.5 or greater.

The example engine 400 can be operated as a dual-fuel engine. The engine 400 has a first fuel, a liquid fuel, supplied to the prechamber volume 202 and a second fuel, fuel gas, supplied to the combustion chamber 104. The engine 400 can operate on only liquid fuel. The engine 400 can also operate on nearly all fuel gas, using the fuel gas as a primary fuel and the liquid fuel as a pilot fuel. The engine 400 can also operate using any proportion of fuel gas and liquid fuel. The fuels supplied to the engine 400 can change over time. For example, the engine 400 can operate on only liquid fuel for a period of time and then fuel gas is introduced so that the engine operates on both liquid fuel and fuel gas. The proportion of fuel gas and liquid fuel can also change. For example, the proportion of fuel gas and liquid fuel can be adjusted (e.g. by the ECM 146) dynamically, depending on the current state or anticipated state of the engine operation.

The example engine 400 can operate as a single-fuel engine with only liquid fuel, supplied via the liquid fuel injector 214 into the prechamber volume 202. In an example single-fuel operation, the liquid fuel injector 214 supplies the entire charge of liquid fuel into the prechamber volume 202. The liquid fuel in the chamber 104 and prechamber volume 202 can then be ignited via compression and/or ignited using the glow plug 216. It may be desirable to operate the engine 400 using only liquid fuel, such as during engine start-up or when a supply of fuel gas is unavailable or inconsistent. After engine start-up, the engine can continue to operate on only liquid fuel or the engine can operate on a combination of liquid fuel and fuel gas. The example engine 400 can use the same single FPC 106 for liquid fuel, fuel gas, or any ratio of the two. Example engine 400 can be used in dual-fuel applications where full liquid fuel operation is required, while adding full fuel gas capability into an already space-constrained engine package.

As mentioned, in certain instances, the example engine 400 can also operate as a dual-fuel engine with the fuel gas supplied as a primary fuel and the liquid fuel supplied as a pilot fuel to ignite the fuel gas. A pilot fuel is a fuel that ignites before the primary fuel and subsequently ignites the primary fuel. In the case of a liquid pilot fuel operation, the temperature and pressure generated in the cylinder can be sufficient to autoignite the liquid fuel present within the prechamber volume 202 or combustion chamber 104 but insufficient to autoignite fuel gas present. The fuel gas can then be ignited by the flame kernel produced by the liquid fuel's ignition. As the prechamber fuel combusts, flames can jet out of the prechamber volume 202 into the combustion chamber 104, igniting any primary fuel present in the combustion chamber 104. In some examples, the liquid fuel can be used in a micropilot or nanopilot arrangement, or with a separate spark plug. In some examples, a glow plug 216 can provide additional heat to facilitate liquid fuel ignition, such as during engine start-up. In high compression ratio engines such as diesel engines converted to dual fuel, it is possible for lubricating oil to auto-ignite in the main combustion chamber either before or along with the pilot liquid fuel. In a pure diesel or very lean dual fuel engine, the oil autoignition is not of concern because the main mixture is too lean to support combustion. However, in dual fuel engines with mixtures rich enough to support a flame (lambda <2.0), oil autoignition leads to un-controlled combustion and potential knock and over-pressure due to the combustion phasing and burn rate coming from the additional ignition sites represented by oil droplets. With a pilot injection into a prechamber, however, the conditions for auto-ignition in the prechamber are more favorable than the main chamber, so it is possible to design the engine to ignite the pilot fuel in the prechamber without having high enough compression ratio to auto-ignite the main chamber oil droplets.

Figure 3B:
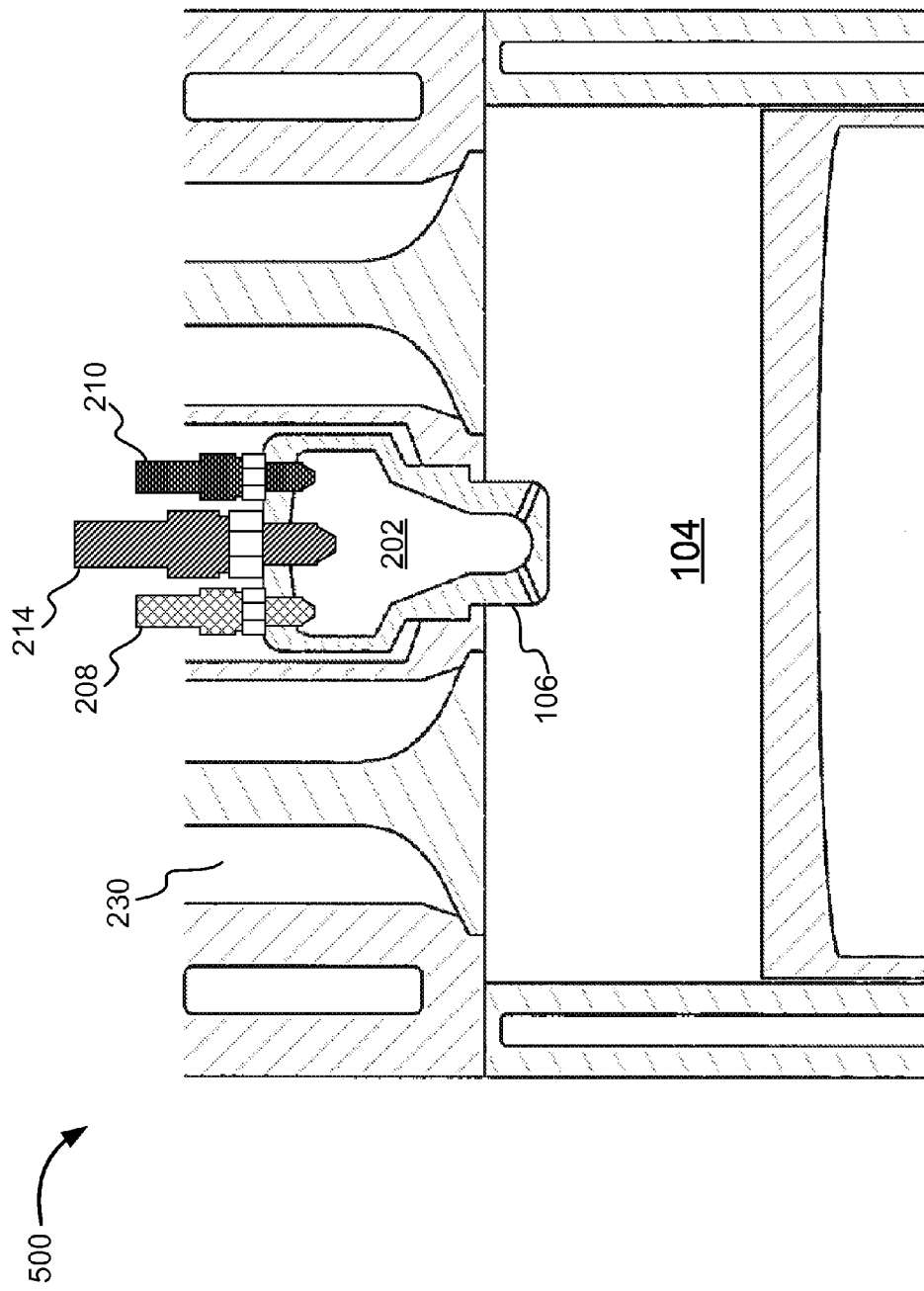
FIG. 3B is a schematic detail diagram of an oxygen-supplied, fuel gas-fueled, and liquid-fueled prechamber.

FIG. 3B depicts an example engine 500 with indirect diesel injection. The engine 500 is substantially similar to the engine 200 shown in FIG. 1B and engine 400 shown in FIG. 3A, including a combustion chamber 104, a FPC 106, and a prechamber volume 202. The example engine 500 also includes an oxygen injector 208, a liquid fuel injector 214, and a fuel gas injector 210. The injectors 208, 214, 210 have outlets to the prechamber volume 202. The example engine 500 does not include a glow plug 216 in the prechamber volume 202, though a glow plug 216 may be present in other embodiments. The liquid fuel injector 214 can be coupled to a fuel supply system such as the diesel supply system in FIG. 1A. The fuel gas injector 210 can be coupled to a fuel gas supply system such as that described in FIG. 1A. The oxygen injector 208 can be coupled to an oxygen supply system such as described in FIG. 1A. The oxygen injector 208 and the oxygen supply system may not be present in other embodiments.

The fuel gas supply system coupled to example engine 500 can also supply fuel gas to the intake passage 230 of the engine, e.g., via a fuel/air mixer, fuel gas injector and/or otherwise. In other embodiments, the fuel gas supply system supplies the fuel gas directly to the combustion chamber 104, such as through a separate fuel gas injector. In some examples, the fuel gas supply system can supply the fuel gas to the combustion chamber at a global lambda of 1.5 or greater.

The example engine 500 can be operated as a dual-fuel engine. The engine 500 has a first fuel, a liquid fuel, supplied to the prechamber volume 202 and a second fuel, fuel gas, supplied to the prechamber volume 202 and the combustion chamber 104. The engine 500 can operate on only liquid fuel, using liquid fuel as a primary fuel. The liquid fuel is supplied to the engine via the injector 214 into prechamber volume 202. The liquid fuel is then ignited by compression and/or a glow plug 216, if present. The engine 500 can also operate on nearly all fuel gas, using the fuel gas as a primary fuel and the liquid fuel as a pilot fuel as described previously. The engine 500 can also operate using any proportion of fuel gas and liquid fuel. In some embodiments, all of the fuel gas supplied to the combustion chamber 104 is supplied via the injector 210 through the ventilation holes in the FPC 106.

The example engine 500 can be operated as a dual-fuel engine on fuel gas, using liquid fuel with oxygen as a pilot ignition. For example, air can be supplied to the chamber 104 through the engine intake 230 and all of the fuel gas can be provided via the injector 210 into the prechamber volume 202. The charge of fuel gas supplied via the injector 210 can be adjusted to provide a specific lambda within the prechamber volume 202 or the combustion chamber 104. In other examples, the fuel gas is provided to the intake 230 of the engine or is injected directly into the chamber 104 via an additional fuel gas injector (not shown). After the desired lambda of the prechamber volume 202 and/or chamber 104 is achieved, liquid fuel is injected into the prechamber volume 202 by injector 214 and oxygen is injected into the prechamber volume 202 by injector 210. The liquid fuel plus oxygen in the prechamber volume 202 is ignited via compression (and/or glow plug 216), and the resulting flame kernel ignites the fuel gas in the prechamber volume 202 and combustion chamber 104, as described previously.

As described previously, supplying oxygen to the prechamber volume 202 can reduce the amount of NOx and soot produced and also allow the use of a smaller prechamber volume 202. Controlling the supply of oxygen can control the ignition delay, as oxygen can enhance the combustion process and shorten the overall burn duration. Providing less oxygen to the prechamber volume 202 can delay the ignition process, as combustion in the prechamber volume 202 will be slower with less oxygen present. Providing more oxygen to the prechamber volume 202 can speed up the ignition process, as the flame jets that ignite the main combustion chamber are produced earlier. Providing more oxygen can also increase the overall pressure within the prechamber volume 202, which can cause the flame jets to extend deeper into the main combustion chamber, igniting the fuel in the combustion chamber more evenly and completely. Oxygen can also be supplied to boost performance during engine load transients, such as during acceleration. More oxygen can be supplied to the prechamber for several engine cycles to temporarily produce more power and simultaneously limit the production of soot. Thus, the supply of oxygen can be dynamically controlled (e.g. via an ECM 146) to improve engine efficiency and performance.

Supplying both oxygen and fuel to the prechamber volume 202 can also allow for precise control of the lambda of the mixture in the prechamber volume 202. The fuel and oxygen can be injected into a relatively localized area at specific amounts, and thus the lambda of the prechamber volume 202 can be predictably determined. The amount of oxygen and fuel can be adjusted (e.g. via an ECM 146) for different operating conditions. For example, the amount of fuel and oxygen introduced into the prechamber volume 202 can be sized to provide an appropriate energy to deliver turbulent jets into the combustion chamber 104. The amount of oxygen supplied to the prechamber volume 202 can be adjusted to control both the energy content in the turbulent jets and the temperature of the combustion in the prechamber volume 202. The oxygen and fuel injected into the prechamber volume 202 can also displace diluents (e.g. combustion residuals, soot) and flush them out of the prechamber volume 202. If liquid fuel is injected into the prechamber volume 202 as a pilot fuel, the timing of oxygen injection could be the ignition trigger. In some cases, the fuel and oxygen can be injected simultaneously, and in other cases the fuel and oxygen are injected with different timings to facilitate mixing prior to ignition. The timing and amounts of fuel and oxygen can be adjusted to create a stratified distribution of fuel and oxygen within the prechamber volume 202. For example, liquid fuel could be injected before oxygen such that the concentration of oxygen is greater near the injector and the concentration of fuel is greater near the jet apertures. The timing and amounts of fuel and oxygen can be adjusted to produce a stoichiometric or near-stoichiometric mixture in the prechamber volume 202 or a portion of the prechamber volume 202.

Using a liquid fuel as a pilot fuel for fuel gas ignition (with or without additional oxygen) can provide benefits to engine efficiency. For example, by adjusting the fuel/air ratio dynamically, the engine power output can be controlled without the use of a throttle. For example, during low-load operation it may be desirable to reduce the engine output power.

It is possible that volume constraints may require a single injector for fuel gas and oxygen in the FPC 106. These constituents may be mixed prior to delivery to a combined injector in the FPC 106. The mixed gases may be used to purge prechamber volume 202 of nitrogen prior to the ignition event.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

Certain aspects encompass a system having an engine. The engine has a combustion chamber, a pre-combustion chamber apart from the combustion chamber, and an opening spanning between the combustion chamber and the pre-combustion chamber. The engine also has a first fuel supply system adapted to supply liquid fuel to the pre-combustion chamber and a second fuel supply system adapted to supply a second, different fuel to the combustion chamber.

Certain aspects encompass a method where an engine is operated on liquid fuel supply directly into a pre-combustion chamber of the engine. The pre-combustion chamber resides apart from a combustion chamber of the engine. The engine is also operated on the liquid fuel supplied directly into the pre-combustion chamber of the engine and a second, different fuel supplied into the combustion chamber.

The aspects above include some, none, or all of the following features. In certain instances, the liquid fuel is diesel fuel. The second fuel supply system can include a fuel gas outlet into an intake of the engine and an oxygen supply system adapted supply an oxygen flow to the pre-combustion chamber. The fuel gas can include natural gas, biogas, landfill gas, methane and/or other short chain hydrocarbons. In certain instances, the pre-combustion chamber includes a glow plug. In certain instances, the first fuel supply system includes a liquid fuel injector with an outlet to the pre-combustion chamber. In certain instances, the first fuel supply system is adapted to supply the liquid fuel as a pilot fuel to ignite the fuel gas, and the second fuel supply system is adapted to supply the fuel gas to the combustion chamber as a primary fuel. In certain instances, the second fuel supply system is adapted supply the fuel gas to the combustion chamber at a lambda of 1.5 or greater. The first fuel supply system can supply the liquid fuel as a primary fuel. In certain instances, the second fuel supply system includes a fuel gas fuel injector with an outlet to the pre-combustion chamber. In certain instances, the second fuel supply system is adapted to supply the fuel gas to the combustion chamber at an overall lambda of 1.5 or greater via an intake of the engine. In certain instances the second fuel supply system is adapted to supply the fuel gas to the combustion chamber at an overall lambda of 1.5 or greater via an intake of the engine. In certain instances, the second fuel supply system includes a fuel gas fuel injector with an outlet in the pre-combustion chamber and no supply fuel gas to the combustion chamber. An oxygen supply is adapted to supply and oxygen flow to the pre-combustion chamber. The opening spanning between the combustion chamber and the pre-combustion chamber can be a jet aperture.

A number of examples have been described. Nevertheless, it will be understood that various modifications can be made. Accordingly, other implementations are within the scope of the following claims.

The invention claimed is:

1. A system, comprising:
an engine comprising:
a combustion chamber;
a pre-combustion chamber apart from the combustion chamber;
an opening spanning between the combustion chamber and the pre-combustion chamber;
a first fuel supply system adapted to supply liquid fuel to the pre-combustion chamber; and
a second fuel supply system adapted to supply a second, different fuel to the combustion chamber, the second fuel supply system comprising a fuel gas fuel injector with an outlet to the pre-combustion chamber.

2. The system of claim 1, where the liquid fuel is diesel fuel.

3. The system of claim 1, where fuel gas comprises natural gas, biogas, landfill gas, or methane.

4. The system of claim 1, comprising a glow plug in the pre-combustion chamber.

5. The system of claim 1, where the first fuel supply system comprises a liquid fuel injector with an outlet to the pre-combustion chamber.

6. The system of claim 1, where the first fuel supply system is adapted to supply the liquid fuel as a pilot fuel to ignite the fuel gas; and
where the second fuel supply system is adapted to supply the fuel gas to the combustion chamber as a primary fuel.

7. The system of claim 6, where the second fuel supply system is adapted to supply the fuel gas to the combustion chamber at a lambda of 1.5 or greater.

8. The system of claim 6, where the first fuel supply system is adapted to supply the liquid fuel as a primary fuel.

9. The system of claim 1, comprising
an oxygen supply adapted to supply an oxygen flow to the pre-combustion chamber.

10. The system of claim 1, where the opening spanning between the combustion chamber and the pre-combustion chamber comprises a jet aperture.

11. A method, comprising:
operating an engine on liquid fuel supplied directly into a pre-combustion chamber of the engine, the pre-combustion chamber residing apart from a combustion chamber of the engine; and
operating the engine on the liquid fuel supplied directly into the pre-combustion chamber of the engine and a second, different fuel supplied into the combustion chamber, the second fuel supplied into the combustion chamber through the pre-combustion chamber.

12. The method of claim 11, where the liquid fuel is diesel fuel.

13. The method of claim 11, where operating the engine on liquid fuel supplied directly into the pre-combustion chamber and the second fuel supplied into the combustion chamber comprises igniting the second fuel with the liquid fuel.

14. The method of claim 13, where the second fuel comprises fuel gas.

15. The method of claim 13, comprising supplying an oxygen flow directly to the pre-combustion chamber.

* * * * *